United States Patent
Helvey et al.

(10) Patent No.: US 9,858,380 B2
(45) Date of Patent: Jan. 2, 2018

(54) DETERMINING POSITIONS OF STORAGE ELEMENTS IN A LOGIC DESIGN

(71) Applicant: International Business Machines Corporation, Armonk, NY (US)

(72) Inventors: Timothy D. Helvey, Rochester, MN (US); David A. Lawson, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 61 days.

(21) Appl. No.: 14/862,481

(22) Filed: Sep. 23, 2015

(65) Prior Publication Data

US 2017/0083660 A1   Mar. 23, 2017

(51) Int. Cl.
G06F 17/50   (2006.01)

(52) U.S. Cl.
CPC ...... *G06F 17/5081* (2013.01); *G06F 17/5072* (2013.01)

(58) Field of Classification Search
CPC .......................... G06F 17/5081; G06F 17/5072
See application file for complete search history.

(56) References Cited

U.S. PATENT DOCUMENTS

| | | | |
|---|---|---|---|
| 6,845,494 B2 | 1/2005 | Burks et al. | |
| 7,137,093 B2* | 11/2006 | Harn | G06F 17/5072 716/113 |
| 8,060,850 B2* | 11/2011 | Yamane | G06F 17/5072 703/19 |
| 8,392,861 B2* | 3/2013 | Shibatani | G06F 17/5031 703/19 |
| 8,443,328 B2 | 5/2013 | Dartu et al. | |
| 8,468,479 B2 | 6/2013 | Tehrani et al. | |
| 8,473,884 B2 | 6/2013 | Daede et al. | |
| 8,977,995 B1 | 3/2015 | Arora et al. | |
| 9,189,591 B2* | 11/2015 | Segal | G06F 17/5081 |
| 2003/0005398 A1* | 1/2003 | Cho | G06F 17/5072 716/122 |
| 2008/0155486 A1* | 6/2008 | Trevillyan | G06F 17/5045 716/122 |

(Continued)

OTHER PUBLICATIONS

Foltin, Martin, et al., "Efficient Stimulus Independent Timing Abstraction Model Based on a New Concept of Circuit Block Transparency," Proceedings from the 39th IEEE Design Automation Conference, 2002, pp. 158-163.

(Continued)

*Primary Examiner* — Stacy Whitmore
(74) *Attorney, Agent, or Firm* — Patterson + Sheridan, LLP

(57) ABSTRACT

A particular method includes performing a timing analysis of a plurality of sub-units of a unit of a logic design. The method also includes identifying a set of grants, where each grant is associated with a first sub-unit having excess time based on the timing analysis. The method further includes identifying a set of requests, where each request is associated with a second sub-unit having a time deficit based on the timing analysis. The method also includes determining a position of a storage element in the logic design based on the set of grants and the set of requests. The method further includes generating an output indicating the position of the storage element.

20 Claims, 8 Drawing Sheets

(56) References Cited

U.S. PATENT DOCUMENTS

| | | | |
|---|---|---|---|
| 2008/0276212 A1* | 11/2008 | Albrecht | G06F 17/505 716/122 |
| 2008/0307374 A1 | 12/2008 | Gregerson et al. | |
| 2010/0199234 A1* | 8/2010 | Adya | G06F 17/5045 716/113 |
| 2011/0239179 A1* | 9/2011 | Shibatani | G06F 17/5031 716/122 |
| 2012/0216166 A1* | 8/2012 | Suto | G06F 17/5022 716/127 |
| 2013/0061195 A1* | 3/2013 | Adya | G06F 17/5045 716/123 |
| 2015/0220674 A1* | 8/2015 | Mihal | G06F 17/5072 716/113 |
| 2016/0042115 A1* | 2/2016 | Segal | G06F 17/5081 716/136 |
| 2016/0188774 A1* | 6/2016 | Adya | G06F 17/5045 716/108 |
| 2016/0210396 A1* | 7/2016 | Gentry | G06F 17/5081 |
| 2016/0232276 A1* | 8/2016 | Daellenbach | G06F 17/5072 |
| 2016/0335376 A1* | 11/2016 | Arunachalam | G06F 17/5072 |

OTHER PUBLICATIONS

Papa, David A., et al., "RUMBLE: An Incremental, Timing-Driven, Physical-Synthesis Optimization Algorithm," IEEE Transactions on Computer-Aided Design of Integrated Circuits and Systems vol. 27, No. 12, 2008, pp. 2156-2168.

* cited by examiner

US 9,858,380 B2

DETERMINING POSITIONS OF STORAGE ELEMENTS IN A LOGIC DESIGN

I. FIELD OF THE DISCLOSURE

The present disclosure relates generally to modifying a logic design by determining positions of storage elements.

II. BACKGROUND

Integrated circuit devices, commonly known as chips, continue to become more powerful and complex as semiconductor manufacturing technologies have advanced. Whereas early integrated circuit devices included fewer than one hundred transistors, it is now common to integrate hundreds of millions of transistors into a single integrated circuit device. This increased transistor count enables operations that once involved several integrated circuit devices to be implemented in a single integrated circuit device, often providing greater performance at a lower cost. For example, where previously a data processing system might involve separate integrated circuit devices for a microprocessor, a memory, a bus interface, and a memory controller, advances in chip density now permit all of these functions to be integrated into the same integrated circuit device. Such devices are typically known as "systems on a chip" due to the high level of integration.

Increases in chip density have significantly affected the design methodologies used for integrated circuits. Rather than manually laying out individual transistors or logic gates in an integrated circuit design to obtain a desired logic function, functional aspects of the design process are typically separated from the physical aspects.

The functional aspects of a design are addressed via a process known as a logic design (i.e., integrated circuit design), resulting in the generation of a functional definition of a circuit design. The functional definition may be defined in a hardware description language (HDL) such as Very High Speed Integrated Circuit (VHIC) Hardware Description Language (VHDL) or Verilog. An HDL representation of a circuit is analogous in many respects to a software program, as the HDL representation generally defines the logic or functions to be performed by a circuit. By separating logic design from physical layout, functions are capable of being defined at a higher level of abstraction. Many design methodologies rely on hierarchical logic design, where circuits are defined in sub-units and grouped together in one or more units (i.e., parent containers) representing collections of sub-units (i.e., child containers). In hierarchical logic design, logic paths often span from one physical sub-unit (or unit) to another and encounter storage elements (e.g., pipeline stages/latches, registers, etc.) at boundaries of physical sub-units (or units).

III. SUMMARY OF THE DISCLOSURE

According to a particular embodiment, a method includes performing a timing analysis of a plurality of sub-units of a unit of a logic design. The method also includes identifying a set of grants, where each grant is associated with a first sub-unit having excess time based on the timing analysis. The method further includes identifying a set of requests, where each request is associated with a second sub-unit having a time deficit based on the timing analysis. The method also includes determining a position of a storage element in the logic design based on the set of grants and the set of requests. The method further includes generating an output indicating the position of the storage element.

According to another embodiment, a computer-readable storage medium includes instructions that, when executed by a processor, cause the processor to perform operations including performing a timing analysis of a plurality of sub-units of a unit of a logic design. The operations also include identifying a set of grants, where each grant is associated with a first sub-unit having excess time based on the timing analysis. The operations further include identifying a set of requests, where each request is associated with a second sub-unit having a time deficit based on the timing analysis. The operations also include determining a position of a storage element in the logic design based on the set of grants and the set of requests. The operations further include generating an output indicating the position of the storage element.

According to another embodiment, an apparatus includes a computer-readable medium, at least one processor, and program code stored on the computer-readable medium and configured upon execution by the at least one processor to apportion timing allotments in an integrated circuit design that includes a plurality of units. The program code is configured to perform a timing analysis of a plurality of sub-units of a unit of a logic design. The program code is also configured to identify a set of grants, where each grant is associated with a first sub-unit having excess time based on the timing analysis. The program code is further configured to identify a set of requests, where each request is associated with a second sub-unit having a time deficit based on the timing analysis. The program code is also configured to determine a position of a storage element in the logic design based on the set of grants and the set of requests and to generate an output indicating the position of the storage element.

One advantage of the present disclosure is improved timing of logic paths in a logic design by physically and logically changing the location of storage elements of sub-units of the logic design. Features and other benefits that characterize embodiments are set forth in the claims annexed hereto and forming a further part hereof. However, for a better understanding of the embodiments, and of the advantages and objectives attained through their use, reference should be made to the Drawings and to the accompanying descriptive matter.

IV. BRIEF DESCRIPTION OF THE DRAWINGS

V. DETAILED DESCRIPTION

Figure 1:
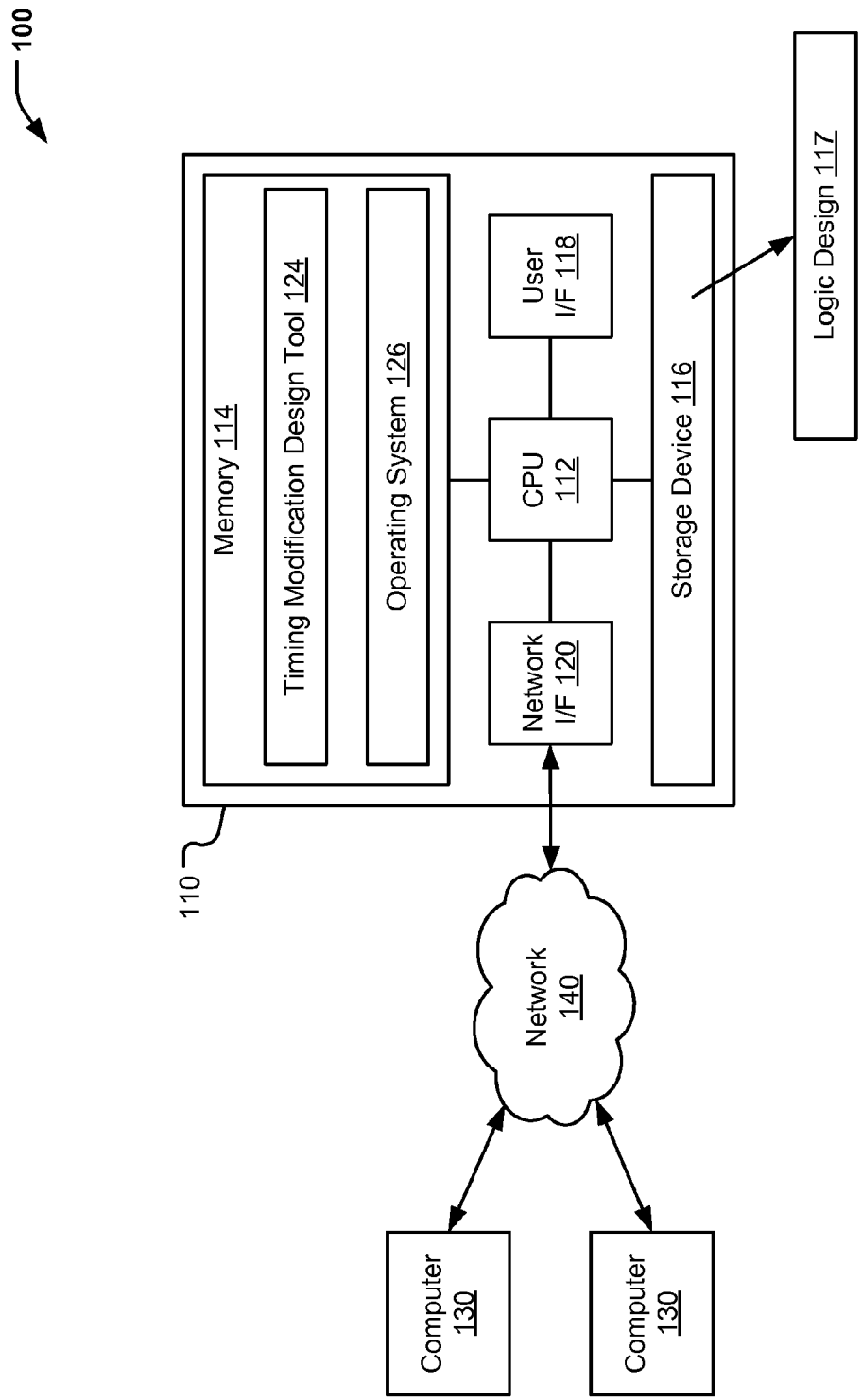
FIG. 1 is a diagram illustrating a system that may be used to modify a logic design by determining positions of storage elements, according to one embodiment.

Example embodiments include slack apportionment techniques (e.g., processes to identify and reallocate timing margin in a logic design). The slack apportionment techniques provide information about storage elements that are available for use to modify timing associated with logic paths of the logic design. Further, exemplary embodiments include slack apportionment techniques that improve the timing of logic paths by physically and/or logically changing the location of the storage elements within the logic design (e.g., across boundaries of physical sub-units).

During the creation of an HDL representation of a logic design, a physical definition of a circuit design may be created via a layout process, often referred to as integration. The design is a "floor plan" of logic gates and interconnects between the logic gates representing the actual physical arrangement of circuit elements of an integrated circuit. Automation tools have been developed to utilize defined cells or blocks of complete circuits to assist with the layout, thus reducing the time used to arrange millions of individual logic gates. For example, synthesis tools have been developed to generate Random Logic Macro (RLM) blocks from an HDL representation of a design. Using those tools a designer can lay out a design by placing the RLM blocks and connecting them to one another to complete the circuit design. In addition, some designs incorporate off-the-shelf (OTS) logic blocks that are reusable from design to design.

After a physical definition is created, testing and simulation of the design may be performed to identify potential timing and/or manufacturability issues. After, the design has been verified by the testing and simulation, the design may be utilized to manufacture integrated circuits.

As integrated circuits have become more complex, the number of individuals involved in the development and testing processes has increased substantially. In many instances, the designers performing the logic design process are completely separate from the designers who perform the physical design processes, and different designers may work on different functional units or circuits within a given design. Furthermore, as integrated circuits have become more complex, larger, and faster, timing issues become more pronounced, sometimes causing the functional definition of a design to be revised after layout has been performed.

In preparing a hierarchical logic design, a timing allotment for each physical sub-unit (or unit) may be determined. Time may be initially apportioned between interconnected sub-units (or units) based on the timing allotment, such that the individuals or teams designing different sub-units may design those sub-units to meet expected timing constraints for the overall design. Some sub-units may violate the timing allotment, which may lead to redesign of those sub-units or other interconnected sub-units so that the overall timing allotment of the circuit is met. Due to the complexity of modern designs, manually reapportioning a timing allotment between various units being developed by different individuals or teams can be difficult to coordinate and time consuming, which may lead to sub-optimal designs.

Example embodiments, advantageously, reapportion sub-unit timing allotments by changing positions of storage elements. For example, a sub-unit (that has a time deficit) may be able to "take" storage elements from another sub-unit's design (that has extra time, e.g., a time grant). Timing analysis can be performed on the various sub-units in a logic design to identify "slack." For example, timing analysis may include a static timing analysis based on a timing specification and delays associated with each of the plurality of sub-units. In this context, slack refers to whether and how much each sub-unit exceeds or falls below its respective timing allotment. A negotiation algorithm may be used to reapportion the timing allotments of the various sub-units. Thus, whenever one sub-unit exceeds its timing allotment (referred to as having "negative slack" or "deficit time"), other sub-units that fall below their timing allotment (referred to as having "positive slack" or "excess time") may "donate" time. Reapportioning timing allotments may be accomplished by moving storage elements. Timing allotments may, therefore, be reapportioned in an automated manner, resulting in either confirmation that the overall timing allotment for the circuit has been met, or identifying units as candidates for redesign to meet their respective reapportioned timing allotments.

FIG. 1 is a diagram illustrating a system that may be used to modify a logic design by determining positions of storage elements, according to one embodiment. FIG. 1 illustrates example hardware components in a computer system 100 that may be used to perform a timing improvement (i.e., timing modification) process by moving storage elements of a hierarchical design. The computer system 100 includes a computer 110, which may be implemented as a server or a multi-use computer that is coupled via a network 140 to one or more client computers 130. The timing modification process may be performed by the computer 110, the computers 130, other networked electronic devices (not shown) or a combination thereof. In embodiments, each of the computers 110, 130 may be any type of computer, computer system, or other programmable electronic device. Further, each of the computers 110, 130 may be implemented using one or more networked computers, e.g., in a cluster or other distributed computing system. Each of the computers 110, 130 may be implemented within a single computer or programmable electronic device, e.g., a server, a desktop computer, a laptop computer, a hand-held computer, phone, tablet, etc.

The computer 110 includes a central processing unit (CPU) 112 including at least one hardware-based processor coupled to a memory 114. The memory 114 may represent random access memory (RAM) devices of main storage of the computer 110, supplemental levels of memory (e.g., cache memories, non-volatile or backup memories (e.g., programmable or flash memories)), read-only memories, or combinations thereof. In addition to the memory 114, the computer system 100 may include other memory located elsewhere in the computer 110, such as cache memory in the CPU 112, as well as any storage capacity used as a virtual memory (e.g., as stored on a storage device 116 or on another computer coupled to the computer 110). The memory 114 may include a timing modification design tool 124, and the storage device 116 may include an example logic design (or designs) 117 (as described in greater detail with reference to FIG. 2A). In embodiments, the timing modification design tool 124 may propose modifications to the logic design 117. For example, the timing modification design tool 124 may generate output indicating proposed positions of storage elements based on timing analysis as described below.

The computer 110 may further be configured to communicate information externally. To interface with a user or operator, the computer 110 may include a user interface (I/F) 118 incorporating one or more user input devices (e.g., a keyboard, a mouse, a touchpad, and/or a microphone, among others) and a display (e.g., a monitor, a liquid crystal display (LCD) panel, light emitting diode (LED) display panel, and/or a speaker, among others). In other examples, user input may be received via another computer or terminal. Furthermore, the computer 110 may include a network interface (I/F) 120 which may be coupled to one or more networks 140 (e.g., a local area network (LAN), a wide area network (WAN), a wireless network, the Internet, etc.) to enable communication of information with other computers and electronic devices. The computer 110 may include analog and/or digital interfaces between the CPU 112 and each of the components 114, 116, 118 and 120. Further, other non-limiting hardware environments may be used within the context of example embodiments.

The computer 110 may operate under the control of an operating system 126 and may execute or otherwise rely upon various computer software applications, components, programs, objects, modules, data structures, etc. (such as the timing modification design tool 124 and related software). Moreover, various applications, components, programs, objects, modules, etc. may also execute on one or more processors in another computer coupled to the computer 110 via the network 140 (e.g., in a distributed or client-server computing environment) where the processing to implement the functions of a computer program may be allocated to multiple computers 130 over the network 140.

In FIG. 1, the storage device 116 is shown to include the logic design 117 (e.g., a preliminary logic design, a final logic design, or both). In other alternative embodiments, the logic design 117 may be stored in the memory 114, in memory in the computers 130, or in any other connected or networked memory storages devices. The logic design 117 may include information describing one or more unit blocks and/or sub-units of a circuit. In an example, the logic design 117 may include data describing one or more blocks of a logic design. In this example, the timing modification design tool 124 may be used to recommend modifying positions of one or more storage elements to improve timing efficiency of the logic design. With greater timing efficiency, processing associated with logic paths in the logic design may be completed more rapidly.

Figure 2A:
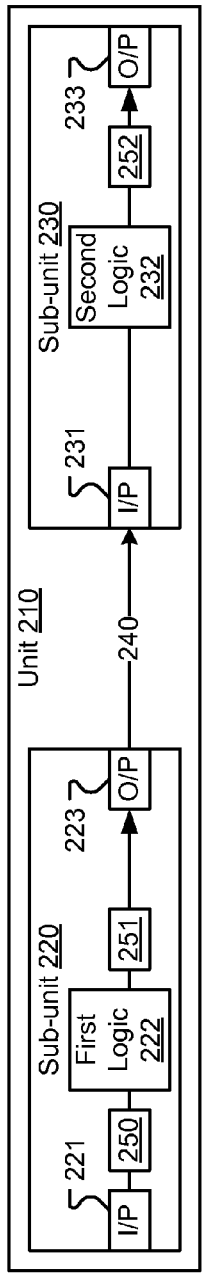
FIGS. 2A-2D are diagrams illustrating an example unit block of a preliminary logic design and final logic designs, according to embodiments.

FIGS. 2A-2D illustrate an example unit block of a preliminary logic design and final logic designs. As illustrated in FIG. 2A, the example unit block includes a unit 210 (e.g. a parent container unit) and one or more sub-units 220, 230 (e.g., child container units). In other examples of FIG. 2A, the example unit block of the logic design may include a single sub-unit, multiple sub-units, or any other combination of units and sub-units.

In FIG. 2A, a logic path 240 is shown. The logic path 240 extends from an input port (I/P) 221 of a first sub-unit 220 through the unit 210 to an output port (O/P) 233 of a second sub-unit 230. In the first sub-unit 220, the logic path 240 includes the input port 221, a first storage element 250, first logic 222, a second storage element 251, and the output port 223. The logic path 240 extends through the unit 210 and to the second sub-unit 230 at an input port 231. In the second sub-unit 230, the logic path 240 includes the input port 231, second logic 232, a third storage element 252, and the output port 233. The first logic 222 and the second logic 232 represent any combination of circuit components that perform processing of data.

In example implementations, each sub-unit 220, 230, may receive data, process the data, and generate an output. For instance, in FIG. 2A, the data may be received from the first storage element 250 (or from other previous storage elements on logic path 240 (not shown)) and the output may be sent to the second storage element 251 or the third storage element 252. Accordingly, timing for the first sub-unit 220 may include: the time to retrieve input data from the first storage element 250, the time to process the data in the first logic 222, and the time to store the data at the second storage element 251. Static timing analysis may be used to estimate timing associated with each sub-unit 220, 230. The static timing analysis may perform a simulation and may utilize delay calculations to compute the expected timing of a digital circuit. Also, in timing analysis, a critical path (i.e., the path between an input port and an output port with a maximum time delay) may be computed by tracing the logic path 240.

In FIG. 2A, through static timing analysis of the first sub-unit 220 and the second sub-unit 230, the logic path 240 may be traced forward through various circuit design components including buffers, inverters, and/or latches (i.e., storage elements) of the unit 210, the first sub-unit 220 and the second sub-unit 230. The static timing analysis may determine a "slack" for circuit components (e.g. first, second, and third storage elements 250, 251, 252, and first and second logics 222, 232), for the unit 210, and/or for the sub-units 220, 230.

Figure 2B:
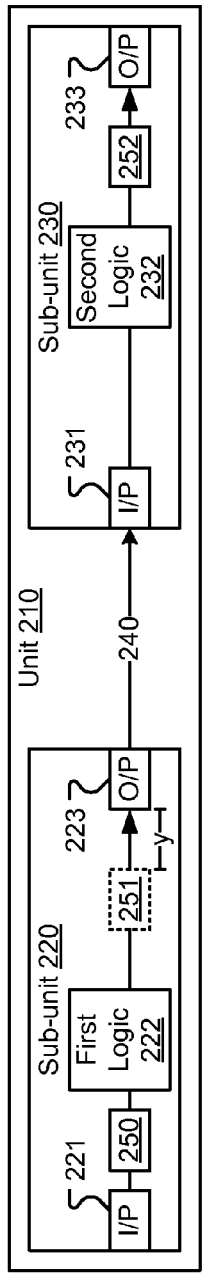
Figure 2C:
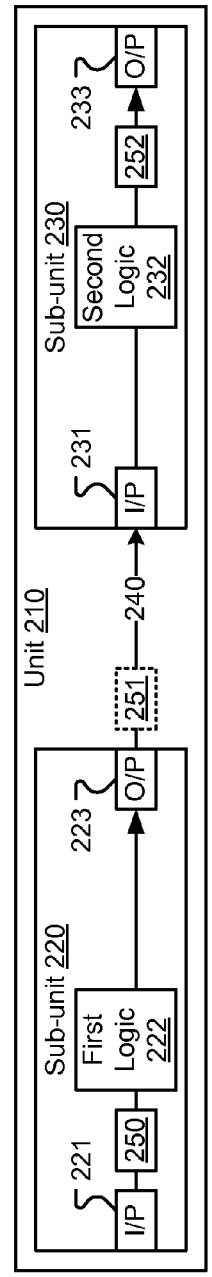
Figure 2D:
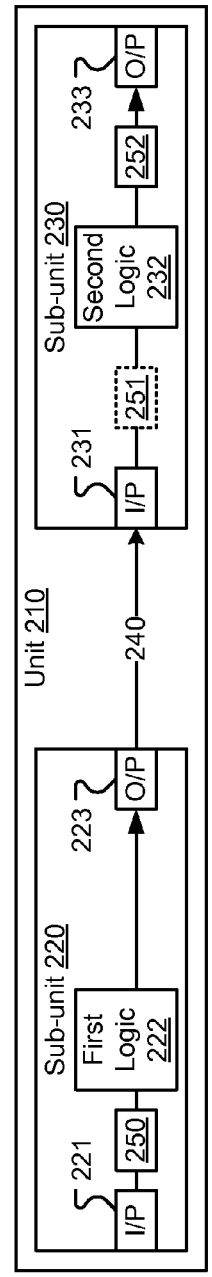

In the example illustrated in FIG. 2A, the static timing analysis may identify that the first sub-unit 220 has positive slack (i.e., excess time) and the second sub-unit 230 has negative slack (i.e., deficit time). In this example, because the first sub-unit 220 has excess time and second sub-unit 230 has deficit time, the storage element 251 in the first sub-unit 220 may be a candidate to move positions within the first sub-unit 220, to the unit 210, or to the second sub-unit 230, as shown, respectively, in FIGS. 2B-2D. In some examples, determining whether the storage element 251 is a candidate to move positions includes performing certain additional processes, as further described with reference to FIGS. 3-6. The timing modification design tool 124 of FIG. 1 may generate an output indicating the proposed modification of the storage element 251, which may be implemented in a final logic design, as shown in FIGS. 2B-2D. In other embodiments, the proposed modification may be reflected in the logic design 117 itself.

In a particular example, after a storage element has been designated as a candidate to move positions (i.e., if the respective sub-unit or unit includes excess time), a further determination is made as to how far the storage element should be moved. For example, this determination may be made based on the amount of slack available, a distance from a current placement of the storage element to a part of the sub-unit that currently includes the storage element, a distance to an adjacent storage unit with deficit time, or a combination thereof. As an example, if a first sub-unit has positive slack (i.e., excess time) and a second sub-unit has negative slack (i.e., deficit time), a storage element of the first sub-unit may be moved closer to the second sub-unit. In an embodiment, a conversion factor may be utilized to determine how far a storage element can be moved. As an example, one pico-second (ps) of slack time may be converted to two micrometers (μm) in distance (i.e., 1 μs=2 μm).

For example, after the storage element 251 is identified as a candidate for relocation (based on the sub-unit 220 having excess time and the sub-unit 230 having deficit time), the excess time value may be converted to a distance value (e.g., Dslack). A distance from the storage element 251 to the output port 223 may be determined (e.g. Dport). If Dport is less than Dslack (i.e., Dport<Dslack), the storage element may be moved outside the sub-unit 220. For example, Dport may be subtracted from Dslack to determine a remaining distance that another sub-unit may use (i.e., Dgrant). Further, a "grant" record may be generated with, for example, the associated port name (e.g. output port 223), the distance Dgrant, the distance Dport, an associated clock time (i.e., the excess time to be transferred), or a combination thereof. In examples, the grant record may be stored in the timing design modification tool 124, the logic design 117, the memory 114, in memory in the computers 130, or in any other connected or networked memory or storage devices. If Dport is greater than Dslack, the storage element 251 may be moved within the first sub-unit 220 (but not outside the first sub-unit 220). In this example, moving the storage element 251 closer to the second sub-unit 230 causes the positive slack (i.e., excess time) of the storage element 251 to be "donated" to the second sub-unit 230 (or to the unit 210). By moving the storage element 251, the processing time of the first sub-unit 220 on the logic path 240 to the new modified location of the storage element 251 is increased because more time would be taken for the data from first logic 222 to reach the storage element 251 at that new location. The positive slack may be called Tgrant, and the "grant" record may be stored to record the Tgrant. For example, the grant record may include the port name, the excess time, the number of storage elements being moved to the second sub-unit 230 or to the unit 210 (which in this example is zero), or a combination thereof.

In an illustrative, non-limiting example, as shown in FIG. 2B, Dslack may be calculated to be 10*2 µm/ps=20 µm and Dport may be 300 µm. In this particular example, Dport is greater than Dslack (i.e., Dport>Dslack), and therefore Tgrant may be 10 ps+0 ps=10 ps. In this case, a grant is recorded (e.g., in a data record associated with unit 210, the first sub-unit 220, and the second sub-unit 230) to indicate that that the storage element 251 of the first sub-unit 220 may be moved 20 µm closer (the distance "y") to the output port 223 and/or up to 10 ps of additional time may be transferred to another sub-unit (e.g., the sub-unit 230) or unit (e.g., the unit 210). Accordingly, by moving the storage element 251 closer to the output port 223, the processing time of the first sub-unit 220 on the logic path 240 to the new modified location of the storage element 251 would be increased because more time would be taken for the data from first logic 222 to reach the storage element 251 at that new location. Conversely, the processing time of the second sub-unit 230 on the logic path 240 would be decreased because less time would be taken to retrieve data from the storage element 251 at the new location and provide the data to the second logic 232.

FIG. 2C illustrates another example of moving the storage element 251. In FIG. 2C, the storage element 251 is moved from the first sub-unit 220 to the unit 210. To illustrate, using an example conversion factor of 1 ps=2 µm, Dslack may be calculated to be 200 ps*2 µm/ps=400 µm and Dport may be 300 µm. In this particular example, Dport is less than Dslack (i.e., Dport<Dslack), and therefore Dgrant (i.e., Dslack–Dport) may be 100 µm. In this case, a grant may be recorded to indicate that the storage element 251 of the first sub-unit 220 may be moved 100 µm outside the output port 223 and into the unit 210. By moving the storage element 251 into the unit 210, the processing time of the first sub-unit 220 would be increased because more time would be taken for the data from the first logic 222 to reach the storage element 251 at the new location. Conversely, the processing time of the second sub-unit 230 on the logic path 240 would be decreased because less time would be taken to retrieve data from the storage element 251 at the new location and provide the data to the second logic 232.

FIG. 2D illustrates another example of moving the storage element 251. In FIG. 2D, the storage element 251 is moved from the first sub-unit 220 to the second sub-unit 230. To illustrate, using the example conversion factor of 1 ps=2 µm, Dslack may be calculated to be 350 ps*2 µm/ps=700 µm and Dport may be 300 µm. In this particular example, Dport is less than Dslack (i.e., Dport<Dslack), and therefore Dgrant (i.e., Dslack–Dport) may be 400 µm. In this case, a grant may be recorded to indicate that the storage element 251 of the first sub-unit 220 may be moved 400 µm outside the output port 223 and into the second sub-unit 230. By moving the storage element 251 into the second sub-unit 230, the processing time of the first sub-unit 220 would be increased because more time would be taken for the data from the first logic 222 to reach the storage element 251 at the new location. Conversely, the processing time of the second sub-unit 230 on the logic path 240 would be decreased because less time would be taken to retrieve data from the storage element 251 at the new location and provide the data to the second logic 232.

In further examples, depending on whether the sub-unit 220 would benefit from decreasing (or increasing) processing time at a particular location, the storage element 250 may be moved closer (or further away) from input port 221 and first logic 222. Similarly, in other examples, depending on whether the sub-unit 230 would benefit from decreasing (or increasing) processing time at a particular location, the storage element 252 may also be moved closer (or further away) from second logic 232 and output port 233.

In example embodiments, when a grant (i.e., a determination based on static timing analysis that a sub-unit (or unit) may "donate" a storage element) is recorded for a storage element, various determinations may be made to determine whether the storage element (e.g., the location of the storage element 251) should be modified.

Figure 4:
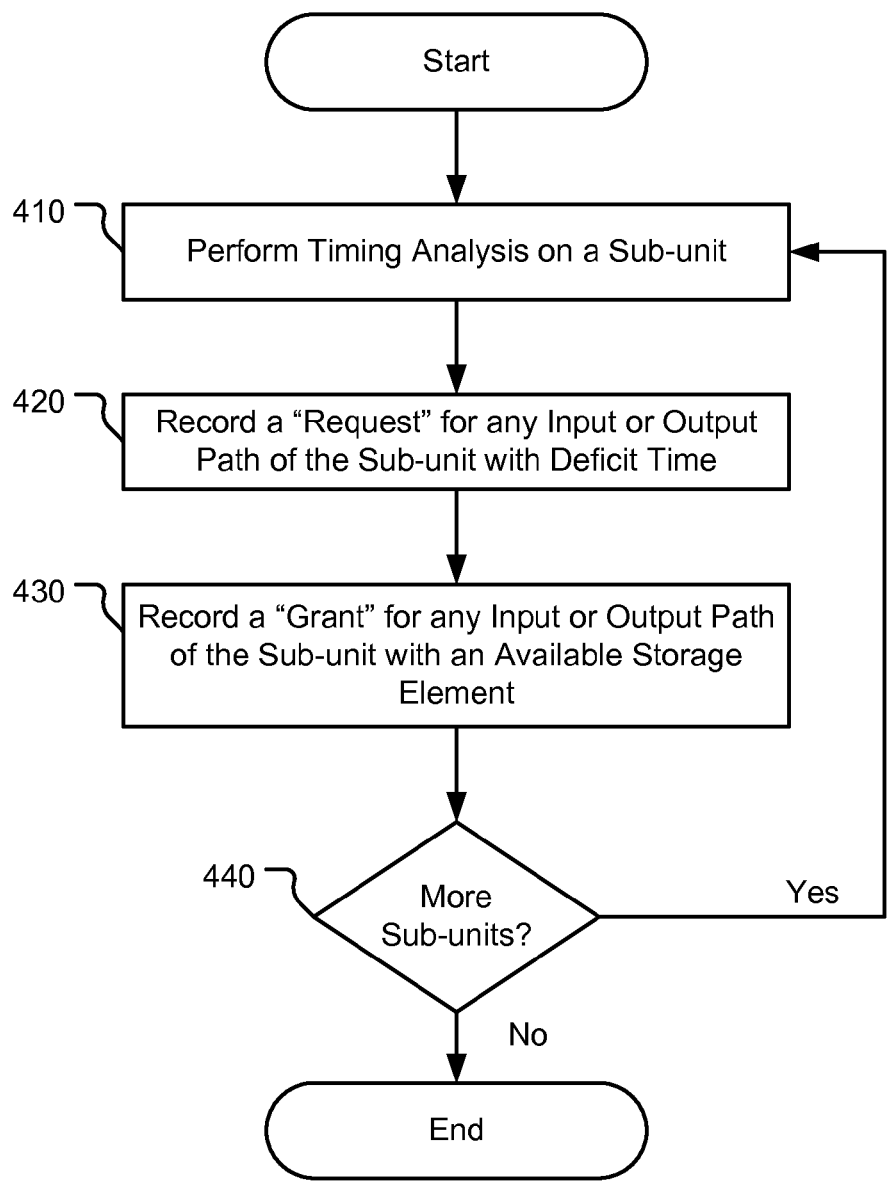
FIG. 4 is a flowchart illustrating an example of an analyze design stage of the process of FIG. 3, according to one embodiment.
Figure 5:
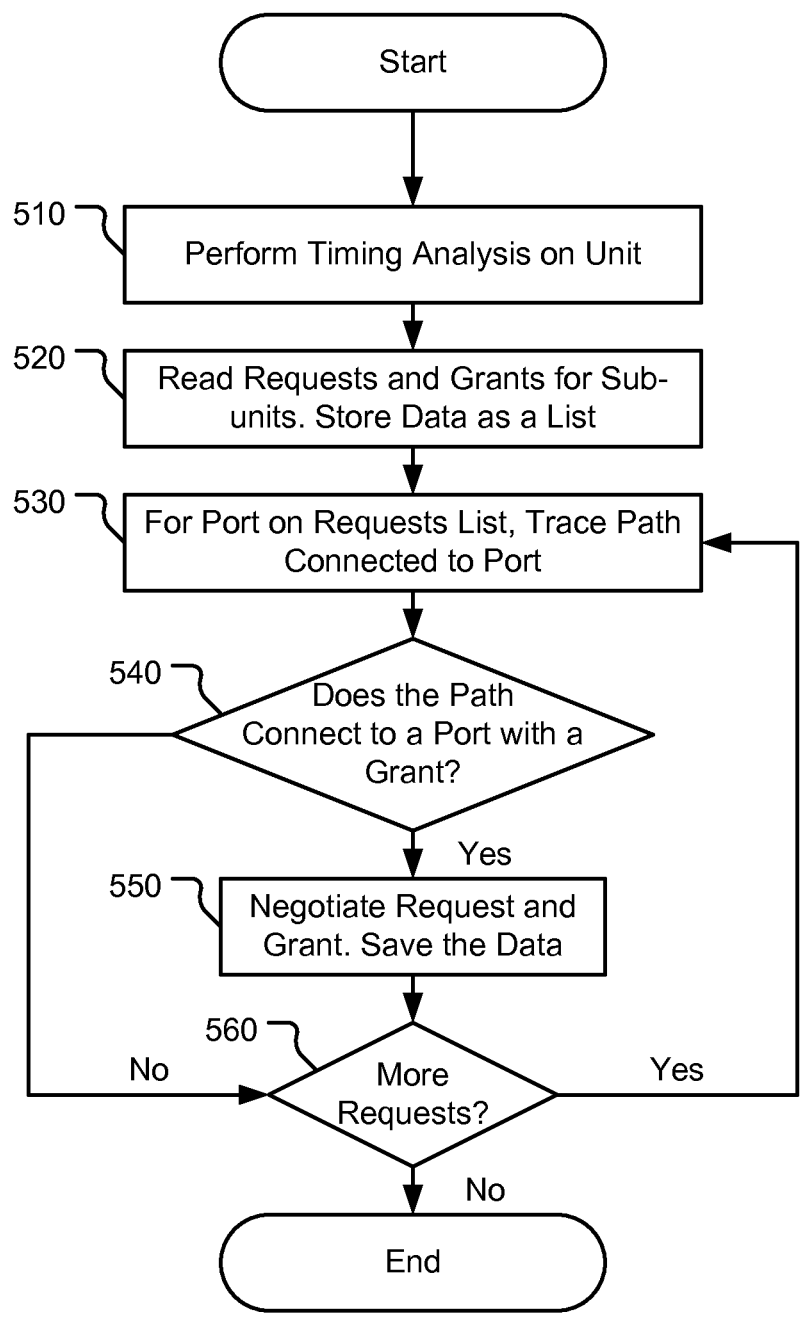
FIG. 5 is a flowchart illustrating an example of a negotiate requests and grants stage of the process of FIG. 3, according to one embodiment.

In implementations, these determinations are made in an analyze design stage (as depicted in FIG. 4) and a negotiate requests and grants stage (as depicted in FIG. 5). For example, a request time may be converted to a distance using a conversion factor (e.g., 1 ps=2 µm). This distance (e.g., 2 µm) may be called Drequest. The distance from the grant port (e.g. output port 223) of a first sub-unit (e.g. sub-unit 220) may be measured and/or calculated to a request port (e.g. input port 231) of a second sub-unit (e.g., sub-unit 230). This second distance may be called Dparent. The lesser of the distance corresponding to the sum of Dgrant and Dport, and the distance of the request time, Drequest, is determined and called Dmin (i.e., a minimum time value).

In examples, if Dmin is less than Dport (i.e., Dmin<Dport), the storage element 251 would not be moved a movement distance out of the granting unit (i.e., the first sub-unit 220). In this instance, a change to the timing constraints may be recorded for both sub-units (e.g., 220 and 230) to transfer time from the granting sub-unit (i.e., the first sub-unit 220) to the requesting sub-unit (i.e., the second sub-unit 230).

In examples, if Dmin is greater than Dport (i.e., Dmin>Dport) and Dmin is less than the sum of Dport and Dparent (i.e., Dmin<(Dport+Dparent)), the storage element may be moved a movement distance to the unit level 210 (i.e., parent level). In this instance, information may be recorded to indicate that the storage element is to be removed from the granting sub-unit and added to the receiving parent unit (e.g., the unit 210, which is the parent unit of the sub-units 220, 230). Further, a change to the timing constraints may be recorded for the granting sub-unit and the receiving parent unit based on the transfer of the storage element from the granting sub-unit to the receiving parent unit.

In examples, if Dmin is greater than Dport (i.e., Dmin>Dport), the storage element may be moved a movement distance to the requesting sub-unit. In this instance, information may be recorded to indicate that the storage element is to be removed from the granting sub-unit and added to the requesting sub-unit. Further, a change to the timing constraints may be recorded for the granting sub-unit and the receiving sub-unit based on the transfer the storage element from the granting sub-unit to the receiving sub-unit.

Figure 3:
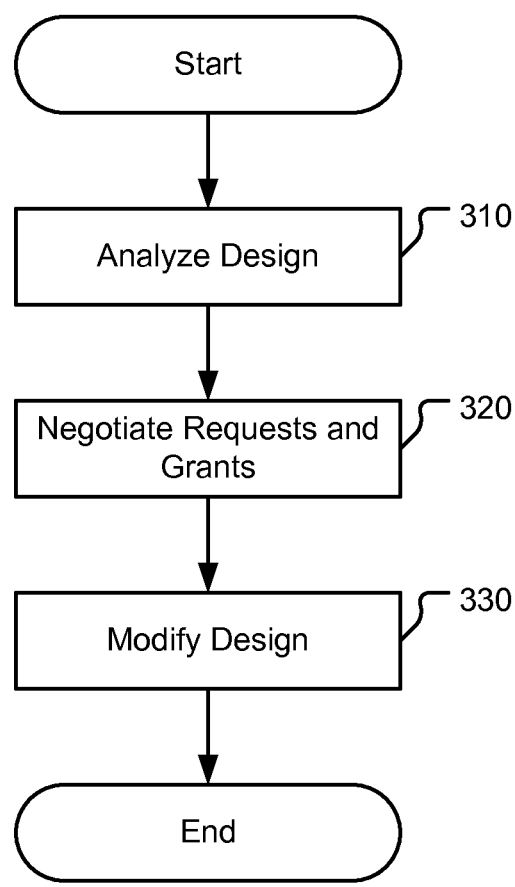
FIG. 3 is a flowchart illustrating an example of a timing improvement process, according to one embodiment.

FIG. 3 is a flowchart illustrating an example of a timing improvement process 300. The timing improvement process 300 may be performed by computer system 100. In embodiments, the timing improvement process 300 includes three stages (e.g., phases, processes, or steps): an analyze design stage 310, a negotiate requests and grants stage 320, and a modify design stage 330. The analyze design stage 310 is described in greater detail with reference to FIG. 4. The negotiate requests and grants stage 320 is described in greater detail with reference to FIG. 5. The modify design stage 330 is described in greater detail with reference to FIG. 6.

FIG. 4 is a flowchart illustrating an example of the analyze design stage 310 of FIG. 3. At 410, a timing analysis is performed for a plurality of sub-units of a logic design. For example, the timing analysis may analyze the plurality of sub-units to determine if storage elements are available for modification and to determine if there are logic paths that may benefit from additional time. Through timing analysis, it may be determined that certain sub-units have deficit time or excess time, and therefore, these sub-units may request or grant storage elements. In embodiments, the timing analysis may be a static timing analysis as described with reference to FIGS. 1 and 2A-2D. When a sub-unit is determined to have positive slack based on the timing analysis, the sub-unit may be determined to have excess time, and therefore a storage element associated with the sub-unit may be designated as a candidate for relocation. When a sub-unit is determined to have negative slack based on the timing analysis, the sub-unit may be determined to have deficit time.

At 420, a "request" may be recorded for an input or output path with deficit time. An input or output path may refer to a logic path between various sub-units and units, where the input or output path crosses from one logic block to another. At 430, a "grant" may be recorded for an input or output path with an available storage element that is a candidate to be moved. At 440, a determination is made whether there are further sub-units (or units in other embodiments) where timing analysis is to be performed. Thus, the analysis and the design stage 310 may result in a set of requests and a set of grants for a plurality of sub-units (or units in other embodiments) of a logic design.

FIG. 5 is a flowchart illustrating an example of the negotiate requests and grants stage 320 of FIG. 3. At 510, timing analysis is performed for one or more units (e.g., at the parent level). For example, the timing analysis may analyze a particular unit and the unit's respective sub-units to determine if storage elements are present and determine if there are logic paths that could benefit from additional time. At 520, requests and grants for the identified sub-units may be read and stored as a list. At 530, for an input or output port of a sub-unit on the requests list (i.e., a requesting sub-unit), the logic path connected to the respective input or output port may be traced. In examples, logic paths may be traced to determine the elements that are encountered on the particular logic path.

At 540, a determination is made whether the logic path connects to an input or output port of a sub-unit with a grant. If so, at 550, the request and the grant of the requesting and granting sub-units may be negotiated using the calculations described with reference to FIGS. 2B-2D. Upon successful negotiation, positions of one or more storage elements may be determined, and proposed modifications of the one or more storage elements in the respective sub-units (or units) may be provided as described below with reference to FIG. 6. Also, the resulting data of the negotiation between the respective granting and requesting sub-units (or units) may be stored in the memory 114, memory in the computers 130, or any other connected or networked memory storages devices as described in FIG. 1. If the logic path does not connect to an input or output port of a sub-unit with a grant, at 560, a further determination is made whether there are more requests from other sub-units. If so, the process returns to 530 to trace the input or output port of the next requesting sub-unit. Otherwise, the negotiate requests and grants stage 320 is completed.

Figure 6:
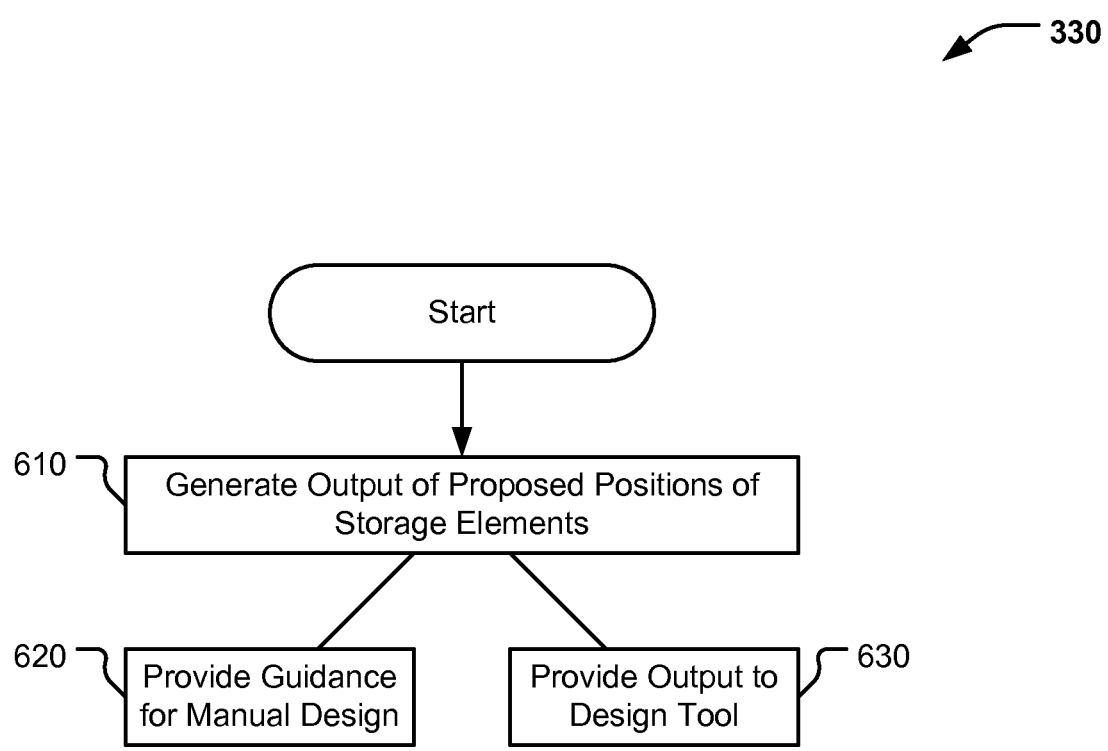
FIG. 6 is a flowchart illustrating an example of a modify design stage of the process of FIG. 3, according to one embodiment.

FIG. 6 is a flowchart illustrating an example of the modify design stage 330 of FIG. 3. At 610, after positions of the one or more storage elements in a logic design are determined (e.g., in the negotiate requests and grants stage 320), based on a set of grants and a set of requests, an output is generated indicating the proposed positions (modified or new positions) of the storage elements. The output may include a set of data including changes to the timing constraints of a logic design and a set of data regarding (and the location of) the storage elements that are to be moved to different locations.

In examples, storage element(s) may be moved within the same sub-unit (e.g., closer to an input or output port of the sub-unit) as illustrated, for example, in FIG. 2B, to a different sub-unit as illustrated, for example, in FIG. 2D, or outside of a sub-unit but within a unit (e.g., a parent container) as illustrated, for example, in FIG. 2C. Further, for each of the storage elements to be moved, timing constraints are modified to account for the movement distance of the storage element and for the addition or removal of a clock period, which may be determined based on the modification of the storage element. In example embodiments, the output generated at 610 may be reflected in the timing modification design tool 124 of FIG. 1, a final logic design (e.g., as shown in FIGS. 2B-2D), or in another location in the computer system 100. At 620, the generated output is provided by displaying the proposed modifications or by generated reports of the proposed modifications to provide guidance for manual design. Alternatively, or in addition, at 630, the generated output may be provided to a design tool (e.g., a separate software design tool or the timing modification design tool 124 of FIG. 1). The design tool may provide decision-making capability during the architectural phase of the integrated circuit design cycle, which may have an impact on the ultimate size, power consumption, performance, and cost. In examples, the design tool may automatically incorporate the proposed modifications into the logic design 117.

Figure 7:
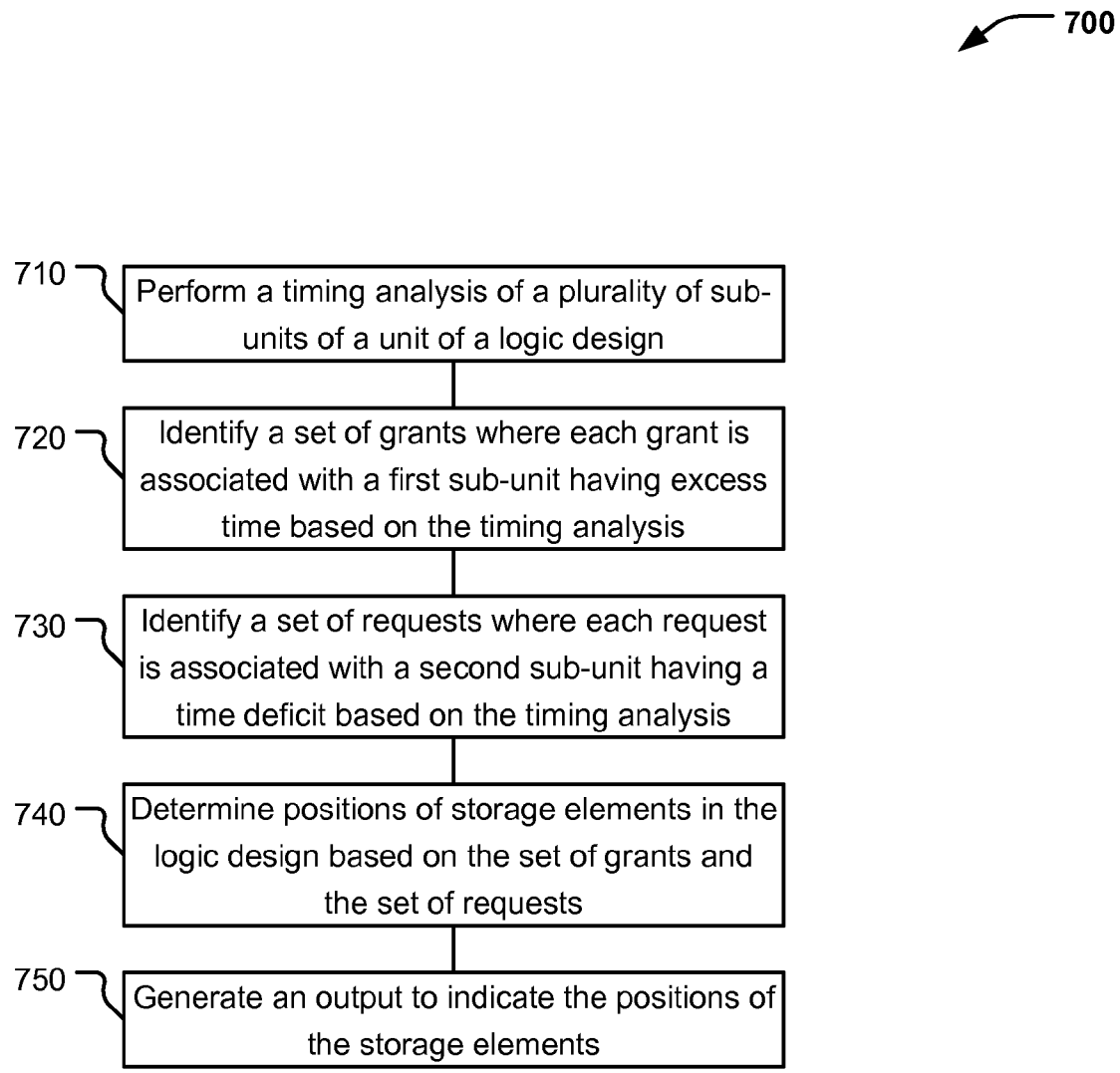
FIG. 7 is a flowchart of a method of determining positions of storage elements in a logic design.

FIG. 7 is a flowchart of a method 700 of determining positions of storage elements in a logic design. In an illustrative implementation, the method 700 is performed by the computer system 100 of FIG. 1.

The method 700 includes performing a timing analysis of a plurality of sub-units of a unit of a logic design, at 710. For example, as described with reference to FIGS. 1-3, the timing modification design tool 124 may perform a timing analysis of a plurality of sub-units of a unit of the logic design 117.

The method 700 includes identifying a set of grants, where each grant is associated with a first sub-unit having excess time based on the timing analysis, at 720. For example, as described with reference to FIG. 4, if a sub-unit includes excess time, a grant may be recorded.

The method 700 includes identifying a set of requests, where each request is associated with a second sub-unit having a time deficit based on the timing analysis, at 730. For example, as described with reference to FIG. 4, if a sub-unit includes deficit time, a request may be recorded.

The method 700 includes determining positions of storage elements in the logic design based on the set of grants and the set of requests, at 740. For example, as described with reference to FIG. 5, through negotiating the requests and grants, the positions of storage elements may be determined.

The method 700 includes generating an output to indicate the modified positions of the storage elements, at 750. For example, as described with reference to FIG. 6, the output indicating the modified positions of the storage elements are generated.

In example embodiments, timing modification may be conducted in additional hierarchical levels of a design by enabling units (e.g., at a parent level) to also record and identify grants and requests for their respective ports and repeating the above processes of FIGS. 3-7 at additional hierarchical levels. In an example, a first unit may "donate" a storage element to a second unit based on a timing analysis of the first and second units that indicates that the first unit has excess time and the second unit has deficit time.

In example embodiments, units may also make requests or grants to associated sub-units if a logical path in the unit may benefit from more time or has storage elements available to grant. In this embodiment, analyses of the distances and slack at the unit level may be performed, and requests or grants may be determined in a similar fashion as described above for sub-units.

Figure 8:
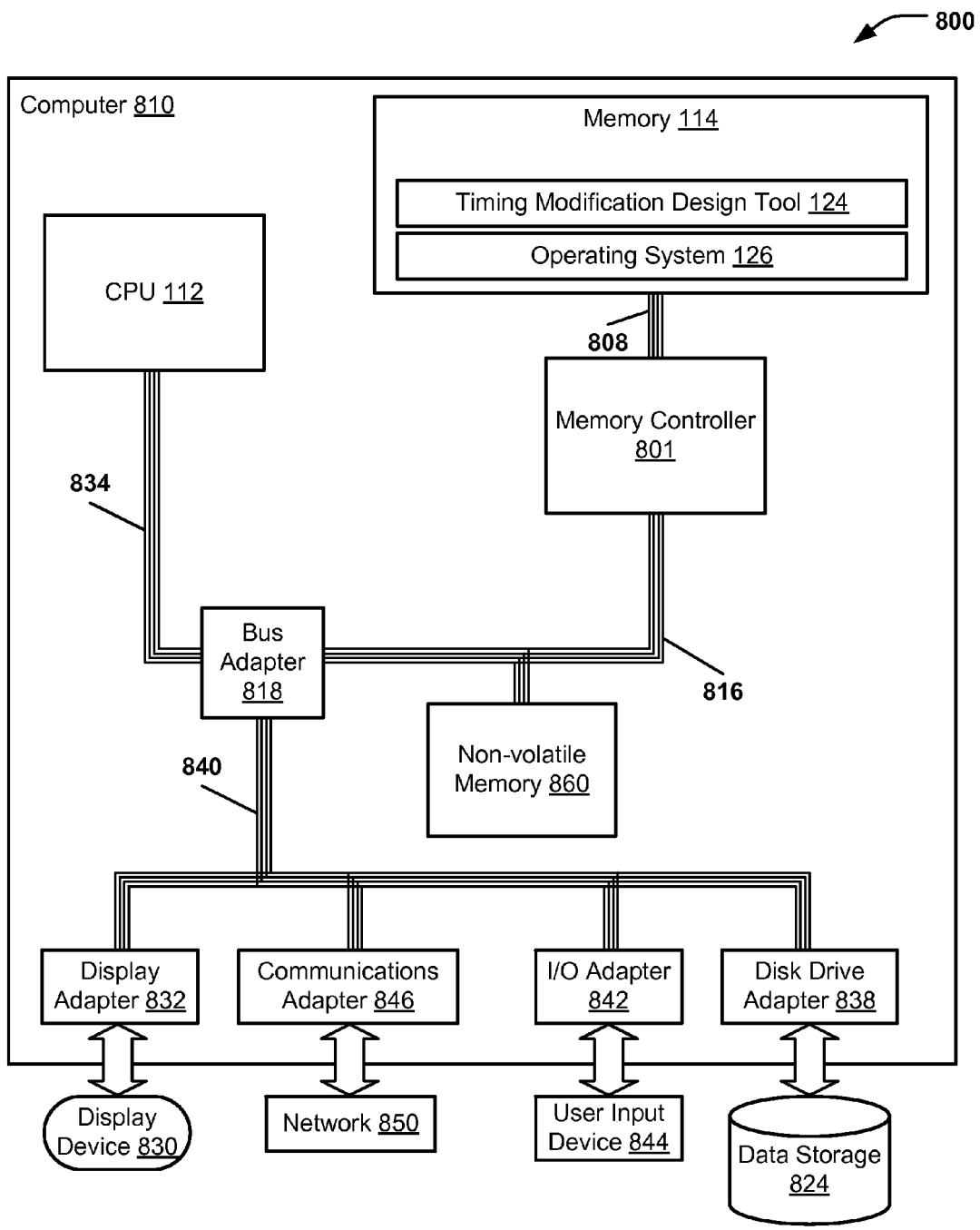
FIG. 8 is a block diagram showing a general computing system that may be used to modify a logic design by determining positions of storage elements, according to one embodiment.

Referring to FIG. 8, an illustrative system 800 including a computer device 810 is shown. The computer device 810 is an exemplary implementation of the computer system 100 of FIG. 1. The computer device 810 includes at least one central processing unit (CPU) 112 as well as the memory 114, a memory controller 801, and a non-volatile memory 860. The memory 114 is connected through a memory bus 808 to the memory controller 801. The memory controller 801 and the non-volatile memory 860 are connected through a memory bus 816 and a bus adapter 818 to the CPU 112 through a processor bus 834.

In the example of FIG. 8, the memory 114 stores the timing modification design tool 124, which may include computer program instructions for carrying out particular tasks (e.g., the operations described with respect to FIGS. 1-7). Also stored at the memory 114 is the operating system 126. Operating systems include, but are not limited to, UNIX® (a registered trademark of The Open Group), Linux® (a registered trademark of Linus Torvalds), Windows® (a registered trademark of Microsoft Corporation, Redmond, Wash., United States), AIX® (a registered trademark of International Business Machines (IBM) Corp., Armonk, N.Y., United States) i5/OS® (a registered trademark of IBM Corp.), and others as will occur to those of skill in the art. The operating system 126 and the timing modification design tool 124 in the example of FIG. 8 are shown in the memory 114, but components of the aforementioned software may also, or in addition, be stored at non-volatile memory (e.g., on data storage, such as data storage 824 and/or the non-volatile memory 860). In FIG. 8, the data storage 824 may include the logic design 117 (e.g., a preliminary logic design and/or a final unit block logic design). In other alternative embodiments, the logic design 117 may be stored in the non-volatile memory 860, or any other connected or networked memory storages devices. In embodiments, data associated with the timing modification design tool 124 and the logic design 117 may be stored in the data storage 824, the non-volatile memory 860, or any other connected or networked memory storages devices.

The computer device 810 includes a disk drive adapter 838 coupled through an expansion bus 840 and the bus adapter 818 to the CPU 112 and other components of the computer device 810. The disk drive adapter 838 connects non-volatile data storage to the computer device 810 in the form of the data storage 824 and may be implemented, for example, using Integrated Drive Electronics ("IDE") adapters, Small Computer System Interface ("SCSI") adapters, Serial Attached SCSI ("SAS") adapters, and others as will occur to those of skill in the art. Non-volatile computer memory also may be implemented as an optical disk drive, electrically erasable programmable read-only memory (so-called "EEPROM" or "Flash" memory), RAM drives, and other devices, as will occur to those of skill in the art. In a particular embodiment, the data storage 824 may store the data and information described herein.

The computer device 810 also includes one or more input/output ("I/O") adapters 842 that implement user-oriented input/output through, for example, software drivers and computer hardware for controlling input and output to and from user input devices 844, such as keyboards and mice. In addition, the computer device 810 includes a communications adapter 846 for data communications with a data communications network 850. The data communications may be carried out serially through Recommended Standard 232 (RS-232) connections (sometimes referred to as "serial" connections), through external buses such as a Universal Serial Bus ("USB"), through data communications networks such as internet protocol (IP) data communications networks, and in other data communication approaches. The communications adapter 846 implements the hardware level of data communications through which one computer sends data communications to another computer, directly or through a data communications network. Examples of the communications adapter 846 suitable for use in the computer device 810 include, but are not limited to, modems for wired dial-up communications, Ethernet (Institute of Electrical and Electronics Engineers (IEEE) 802.3) adapters for wired network communications, and IEEE 802.11 adapters for wireless network communications. The computer device 810 also includes a display adapter 832 that facilitates data communication between the bus adapter 818 and a display device 830, enabling an application (e.g., the timing modification design tool 124) to visually present output on the display device 830.

Aspects of the present disclosure may be incorporated in a system, a method, and/or a computer program product. The computer program product may include a computer-readable storage medium (or media) having computer-readable program instructions thereon for causing a processor to carry out aspects of the present disclosure. The computer-readable storage medium can be a tangible device that can retain and store instructions for use by an instruction execution device.

The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, a special purpose computer, or other programmable data processing apparatus to produce a machine, such that the instructions, which execute via the processor of the computer or other programmable data processing apparatus. The machine is an example of means for implementing the functions/acts specified in the flowchart and/or block diagrams. The computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the functions/acts specified in the flowchart and/or block diagrams.

The computer-readable program instructions may also be loaded onto a computer, other programmable data processing apparatus, or other device to cause a series of operational steps to be performed on the computer, other programmable apparatus or other device to perform a computer implemented process, such that the instructions which execute on the computer, other programmable apparatus, or other device implement the functions/acts specified in the flowchart and/or block diagrams.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in a block in a diagram may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowcharts, and combinations of blocks in the block diagrams and/or flowcharts, can be implemented by special purpose hardware-based systems that perform the specified functions or acts or carry out combinations of special purpose hardware and computer instructions.

Integrated circuits or chips that may be designed and/or fabricated in accordance with the described techniques can be distributed by a fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product. The end product can be any product that includes integrated circuit chips, ranging from low-end applications to advanced computer products having a display, a keyboard or other input device, and a central processor.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to explain the principles of the embodiments, the practical application or technical improvement over technologies found in the marketplace, or to enable others of ordinary skill in the art to understand the embodiments disclosed herein.

Those skilled in the art can make numerous uses and modifications of and departures from the apparatus and techniques disclosed herein without departing from the described concepts. For example, components or features illustrated or described in the present disclosure are not limited to the illustrated or described locations, settings, or contexts. Examples of apparatuses in accordance with the present disclosure can include all, fewer, or different components than those described with reference to one or more of the preceding figures. The present disclosure is therefore not to be limited to specific implementations described herein, but rather is to be accorded the broadest scope possible consistent with the appended claims, and equivalents thereof.

The invention claimed is:

1. A method comprising:
performing, by a processor executing an algorithm stored in a memory, a timing analysis of a plurality of sub-units of a parent unit of a logic design, wherein the plurality of sub-units are part of a hierarchical structure with the parent unit, and where the parent unit includes an integrated circuit and the plurality of sub-units correspond to computer hardware modules;
identifying at the parent unit a set of grants for each of the plurality of sub-units, each grant associated with a first sub-unit having excess time based on the timing analysis;
identifying a set of requests, each request associated with a second sub-unit having a time deficit based on the timing analysis;
determining at the parent unit a position of a storage element in the logic design based on the set of grants and the set of requests;
generating an output indicating the position of the storage element; and
manufacturing the integrated circuit using the logic design.

2. The method of claim 1, further comprising providing the output to a design tool.

3. The method of claim 1, wherein the timing analysis includes a static timing analysis based on a timing specification and delays associated with each of the plurality of sub-units.

4. The method of claim 1, wherein determining the position of the storage element includes modifying the position of the storage element in the logic design from a particular sub-unit to another sub-unit.

5. The method of claim 4, wherein modifying the position of the storage element includes: determining a first deficit time associated with a second sub-unit; determining a first excess time associated with the first sub-unit; determining a minimum time value of the first deficit time and the first excess time; and determining a movement distance of the storage element based on the minimum time value.

6. The method of claim 1, wherein determining the position of the storage element includes modifying the position of the storage element in the logic design within a particular sub-unit.

7. The method of claim 1, wherein determining the position includes modifying the position of the storage element in the logic design from a particular sub-unit to the parent unit.

8. The method of claim 7, wherein modifying the position of the storage element increases a delay of a sub-unit with excess time and reduces the delay of a sub-unit with deficit time.

9. The method of claim 1, wherein determining the position of the storage element is based at least partially on a movement distance of the position of the storage element within the first sub-unit.

10. The method of claim 1, wherein determining the position of the storage element is based at least partially on a movement distance of the position of the storage element within the second sub-unit.

11. The method of claim 1, wherein determining the position of the storage element is based at least partially on a movement distance of the position of the storage element within the parent unit.

12. A computer-readable storage medium comprising instructions that, when executed by a processor, cause the processor to perform operations including:
performing a timing analysis of a plurality of sub-units of a parent unit of a logic design, wherein the plurality of sub-units are part of a hierarchical structure with the parent unit, and where the parent unit includes an integrated circuit and the plurality of sub-units correspond to computer hardware modules;
identifying at the parent unit a set of grants for each of the plurality of sub-units, each grant associated with a first sub-unit having excess time based on the timing analysis;
identifying a set of requests, each request associated with a second sub-unit having a time deficit based on the timing analysis;
determining a position of a storage element in the logic design based on the set of grants and the set of requests;
generating an output indicating the position of the storage element;
testing the logic design; and
initiating the manufacture of the integrated circuit using the logic design.

13. The computer-readable storage medium of claim 12, further comprising providing the output to a design tool.

14. The computer-readable storage medium of claim 12, wherein the timing analysis includes a static timing analysis based on a timing specification and delays associated with each of the plurality of sub-units.

15. The computer-readable storage medium of claim 12, wherein determining the position of the storage element includes modifying the position of the storage element in the logic design from a particular sub-unit to another sub-unit.

16. The computer-readable storage medium of claim 15, wherein modifying the position of the storage element includes: determining a first deficit time associated with a second sub-unit; determining a first excess time associated with the first sub-unit; determining a minimum time value of the first deficit time and the first excess time; and determining a movement distance of the storage element based on the minimum time value.

17. The computer-readable storage medium of claim 12, wherein determining the position of the storage element is based at least partially on a movement distance of the storage element within the first sub-unit.

18. The computer-readable storage medium of claim 12, wherein determining the position of the storage element is based at least partially on a movement distance of a position of the storage element within the second sub-unit.

19. The computer-readable storage medium of claim 12, wherein determining the position of the storage element is based at least partially on a movement distance of the storage element within the parent unit.

20. An apparatus comprising:
 a computer-readable storage medium;
 at least one processor; and
 program code stored on the computer-readable storage medium and configured upon execution by the at least one processor to apportion timing allotments in an integrated circuit design including a plurality of units, wherein the program code is configured to perform a timing analysis of a plurality of sub-units of a parent unit of a logic design, wherein the plurality of sub-units are part of a hierarchical structure with the parent unit, and where the parent unit includes an integrated circuit and the plurality of sub-units correspond to computer hardware modules, identify at the parent unit a set of grants for each of the plurality of sub-units, each grant associated with a first sub-unit having excess time based on the timing analysis, identify a set of requests, each request associated with a second sub-unit having a time deficit based on the timing analysis, determine a position of a storage element in the logic design based on the set of grants and the set of requests, generate an output indicating the position of the storage element, and initiate manufacturing the integrated circuit using the logic design.

\* \* \* \* \*